Dec. 4, 1923.  
F. T. DICKINSON  
MOLDING MACHINE  
Filed June 20, 1921  
1,476,056  
5 Sheets-Sheet 1

INVENTOR.  
Frank T. Dickinson  
BY  
ATTORNEY.

Dec. 4, 1923.
F. T. DICKINSON
MOLDING MACHINE
Filed June 20, 1921
1,476,056
5 Sheets-Sheet 2
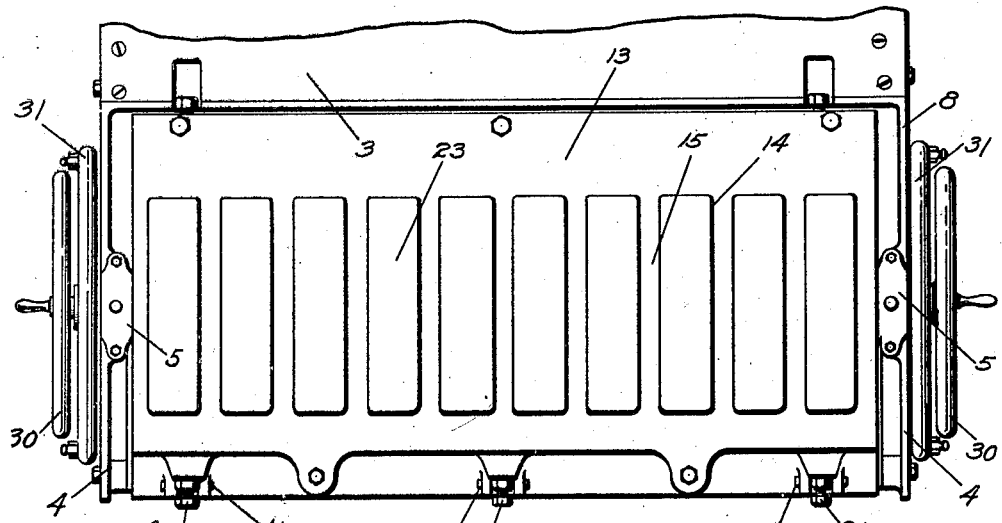
Fig. 2.
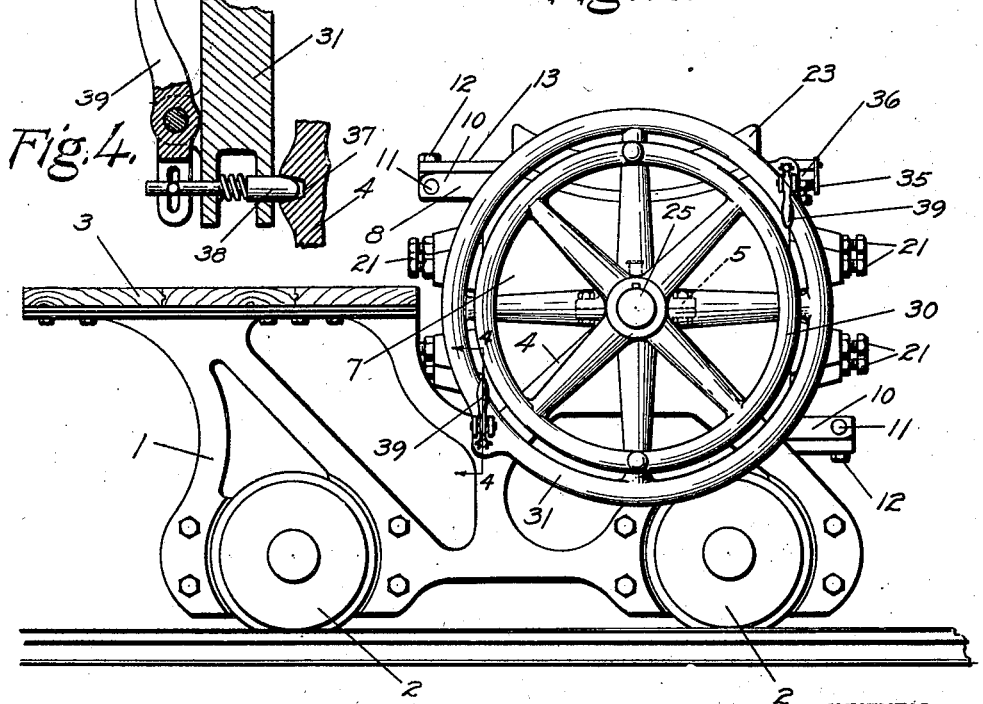
Fig. 4.
Fig. 3.
INVENTOR.
Frank T. Dickinson
BY
ATTORNEY.

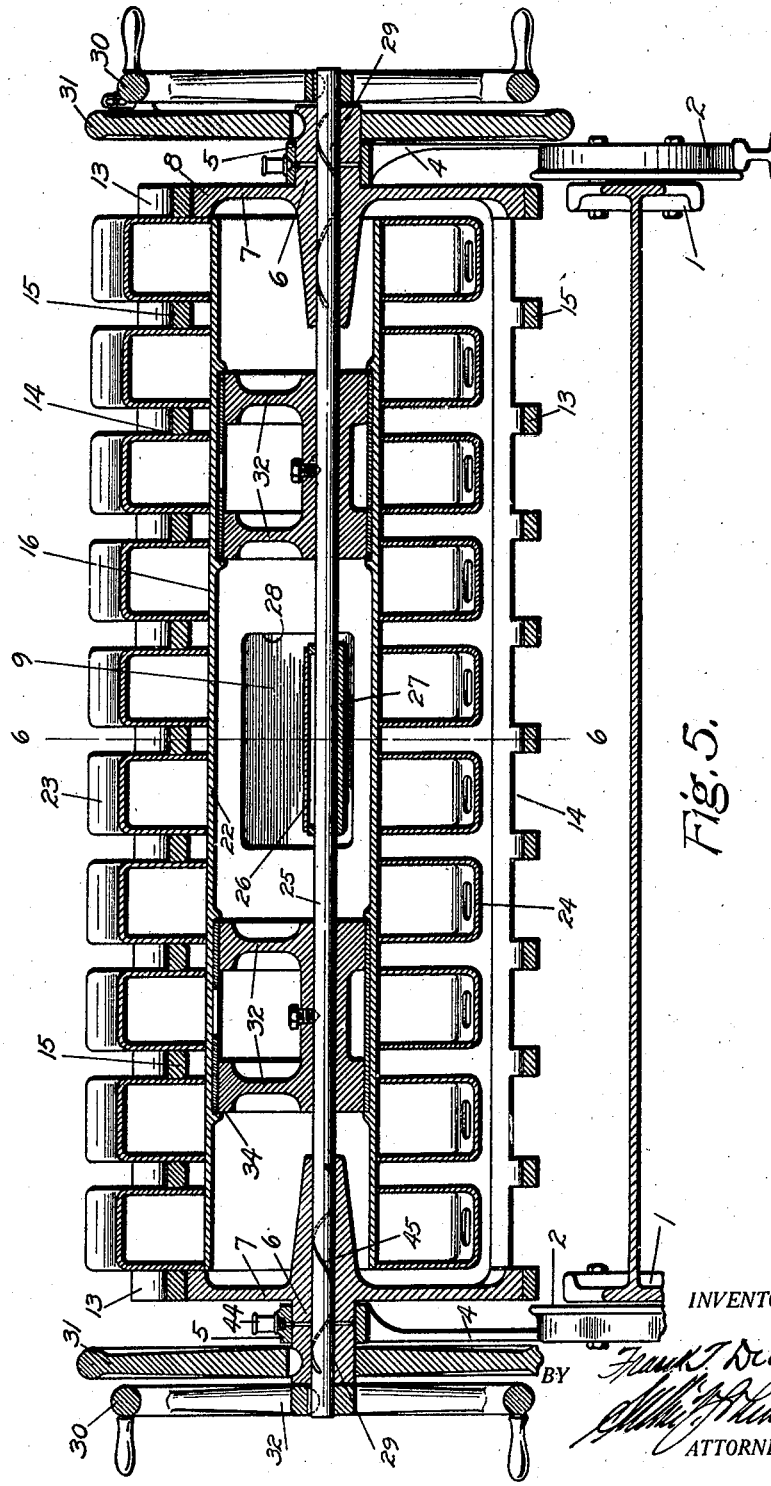

Dec. 4, 1923.

F. T. DICKINSON

MOLDING MACHINE

Filed June 20, 1921     5 Sheets-Sheet 4

1,476,056

INVENTOR.
Frank T. Dickinson
BY
ATTORNEY.

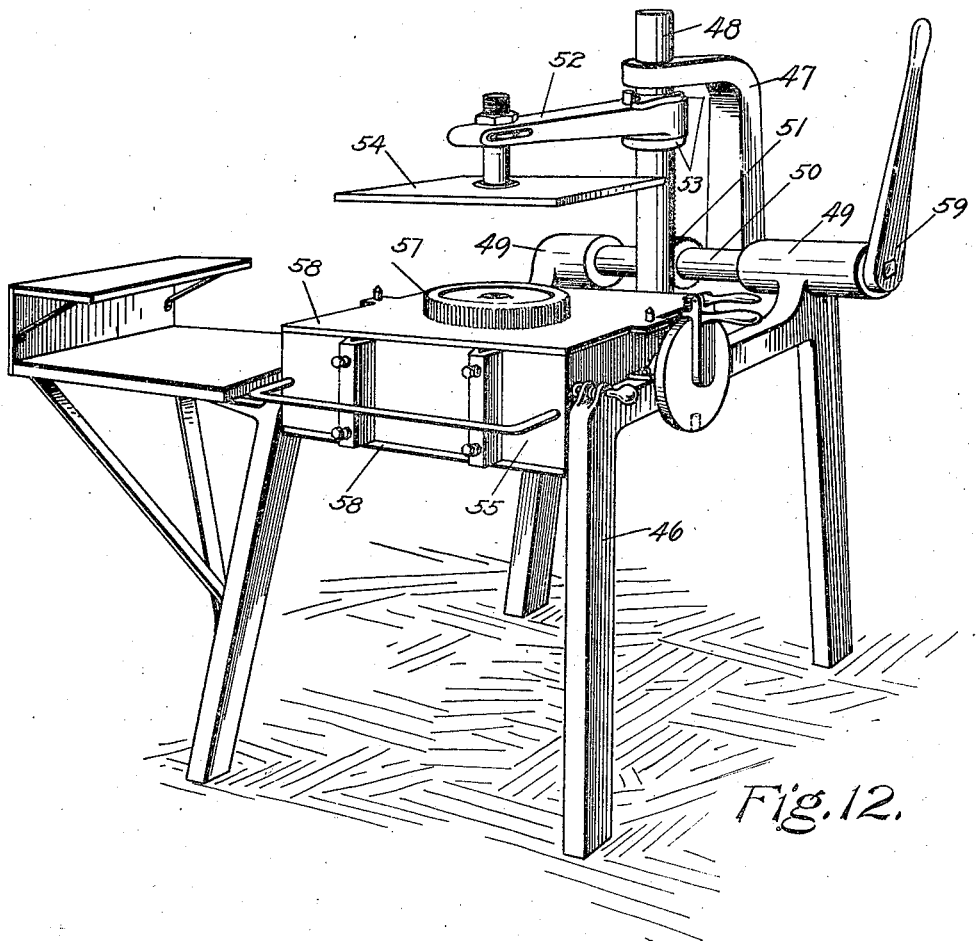
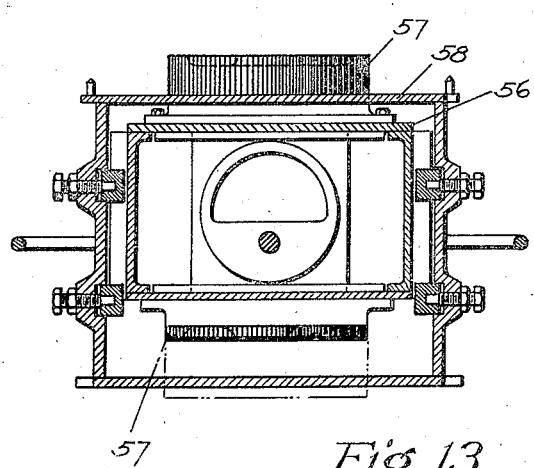

Patented Dec. 4, 1923.

1,476,056

UNITED STATES PATENT OFFICE.

FRANK T. DICKINSON, OF DENVER, COLORADO.

MOLDING MACHINE.

Application filed June 20, 1921. Serial No. 478,808.

*To all whom it may concern:*

Be it known that I, FRANK T. DICKINSON, a citizen of the United States, residing at Denver, in the county of Denver and State of Colorado, have invented new and useful Improvements in Molding Machines, of which the following is a specification.

The present invention is directed to improvements in molding machines for foundries, and has for its primary object to provide a machine particularly adapted for molding brake-shoes, but it will be of course understood that it is not necessarily limited thereto.

A further object of the invention is to provide a machine of this character provided with a plurality of patterns arranged for rectilinear movement, and being capable of being manipulated with respect to a component part of a flask so that impressions of the patterns may be quickly made successively.

A still further object of the invention is to provide a molding machine capable of being moved along a track, and having the stripper plates so arranged that they can be swung, with a component part of a flask thereon to a position to permit convenient handling.

Still another object of the invention is a provide means for moving the patterns in a rectilinear direction, whereby the selected patterns can be easily and quickly moved successively into proper relation with a component part of a flask, and withdrawn from the sand therein.

Another object of the invention is to provide a molding machine having stripper plates so formed that when the patterns are withdrawn from the flask sand the resultant partition walls between the impressions or molds will remain intact.

Still another object of the invention is to provide a molding machine of this character so constructed that a large number of patterns can be operated simultaneously, whereby a machine comparatively small in size can produce a great number of castings in a short time, the machine being extremely simple in construction, durable, and efficient in operation.

A still further object of the invention is to provide novel means whereby a plurality of patterns can be easily and conveniently revolved so as to successively brought into operative or inoperative positions with respect to the associated stripper plate, and held positively in a selected position.

With these and other objects in view, this invention resides in the novel features of construction, formation, combination and arrangement of parts to be hereinafter more fully described, claimed and illustrated in the accompanying drawings, in which:—

Figure 2 is a top plan view.

Figure 3 is an end view.

Figure 4 is a sectional view on line 4—4 of Fig. 3.

Figure 5 is a longitudinal sectional view.

Figure 11 is a perspective view of the mold flasks.

Figure 12 is a perspective view of a modified form of the invention.

Figure 13 is a transverse sectional view through the mold proper of the modified form.

Figure 1:
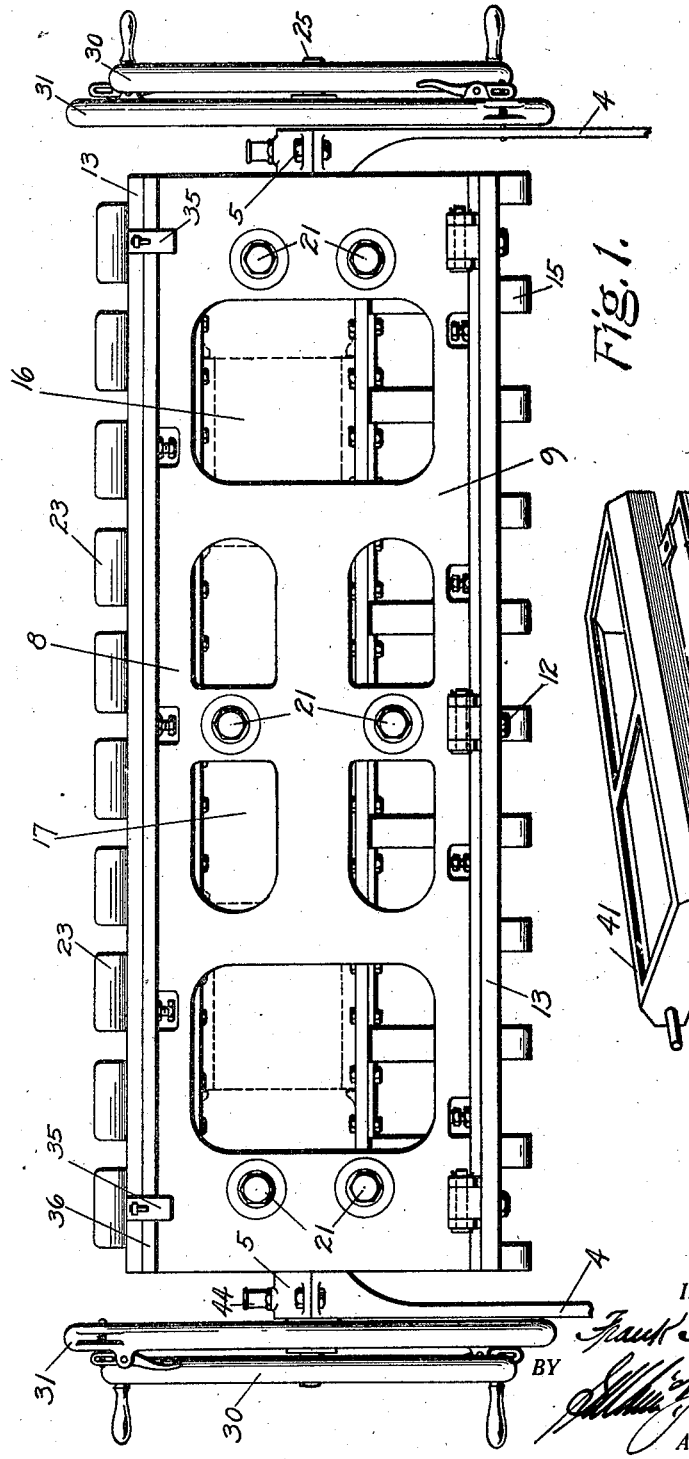
Figure 1 is a side elevation of the machine.

Referring to the drawings, 1 designates a truck having wheels 2 adapted to run on a track to facilitate the operation of the machine in a foundry. Supported by the truck frame 1 is a wooden platform 3 upon which the flask parts are placed in a manner to be hereinafter described. The sides 4 of the frame 1 are provided with boxes 5, in which are rotatably mounted trunnions 6 carried by the end plates 7 of the box-like frame 8. Having their ends fixed to the end plates 7 in any suitable manner are sides 9, the diagonally opposed side edges thereof being provided with heads 10 which are pivotally connected to the respective edges, as at 11.

Connected to these heads by bolts 12 are the adjacent edges of the stripper plates 13.

These stripper plates are curved transversely, the curvature of which being such that one extends into the frame 8, while the other is directed away therefrom, the reason for which will be obvious. Each stripper plate is formed with a plurality of slots 14 and resultant bridge-plates 15. The number of slots shown is ten, but it will be of course understood that the number may be increased or decreased, as desired.

Figure 10:
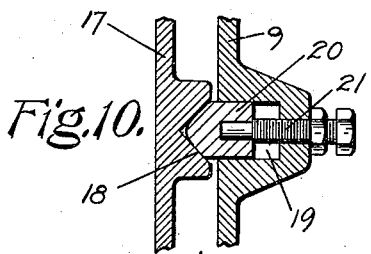
Figure 10 is a detail sectional view through one of the guides.

A pattern supporting box 16 is employed, and is located in the frame 8, said box being rectangular in cross-section, the sides 17 of which are provided with V-shaped grooves 18, preferably three in number. Formed in the sides of the frame 8 are vertically spaced recesses 19 in which are slidably mounted blocks 20, the inner ends of which are shaped to correspond to the shape of the grooves 18, as more clearly shown in Fig. 10. These blocks are adjustable through the medium of the bolts 21 carried by the sides 9 so that should the co-acting parts wear such wear may be taken up so that the box 16 will assume an even movement during operation.

Removably engaged on the two remaining sides 22 of the box 16 are patterns 23 and 24, the former being shaped to form the molds for the wear faces of a brake shoe, while the latter is shaped to form the rear or "lugged" mold.

Extending longitudinally through the frame 8 and box 16 is a shaft 25, the central portion of which is supported in a bearing 26, said bearing being formed in a brace bar 27 which has its ends connected with the sides 9 of the frame 8, there being an opening 28 formed in the sides 17 of the box 16 to accommodate the brace bar, and permit the box to move vertically with respect to the frame 8. The ends of the shaft 25 are journaled in bearings 29 formed in the trunnions 6, and upon each end of said shaft is fixed a hand wheel 30, while a similar wheel 31 is fixed to each trunnion 6.

Fixed to the shaft 25, and upon opposite sides of the bearing 29 are spaced integrally connected paired eccentrics 32 which are revoluble in the blocks 33, said blocks being slidable in guides 34 formed in the sides 22 of the box 16.

To hold the stripper plates 13 in proper positions latches 35 are carried by the diagonally disposed free edges of the plates, said latches being adapted to engage flanges 36 carried by the sides 9 of the frame 8.

The sides 4 of the frame 1 are provided with sockets 37, which are adapted to selectively receive the spring pressed bolts 38 carried by the wheels 31, there being two bolts, and a single socket. These bolts can be withdrawn from the socket through the medium of a lever 39, which is pivotally connected on the wheels 31 at diametrically opposite points, as clearly shown in Fig. 3.

In Fig. 11, the preferred form of flask is shown, the same consisting of component parts 40 and 41, the former having its ends formed with curved seats 43, while the latter has its ends formed with curved extensions 42 adapted to engage the seats when said parts are positioned to form a complete mold. Since the stripper plates 13 are transversely curved for a certain distance of their width it is obvious that the ends of the flask parts are necessarily provided with the seats 42 and 43 so as to snugly engage the respective plates when engaged thereon during the sand tamping operation.

To effectively lubricate the rotating parts oil cups 44 are carried by the boxes 5, the trunnions 6 having longitudinal grooves 45 formed therein so that oil will be directed to the bearings 29, the initial flow of oil furnishing proper lubricant to the boxes.

Figure 6:
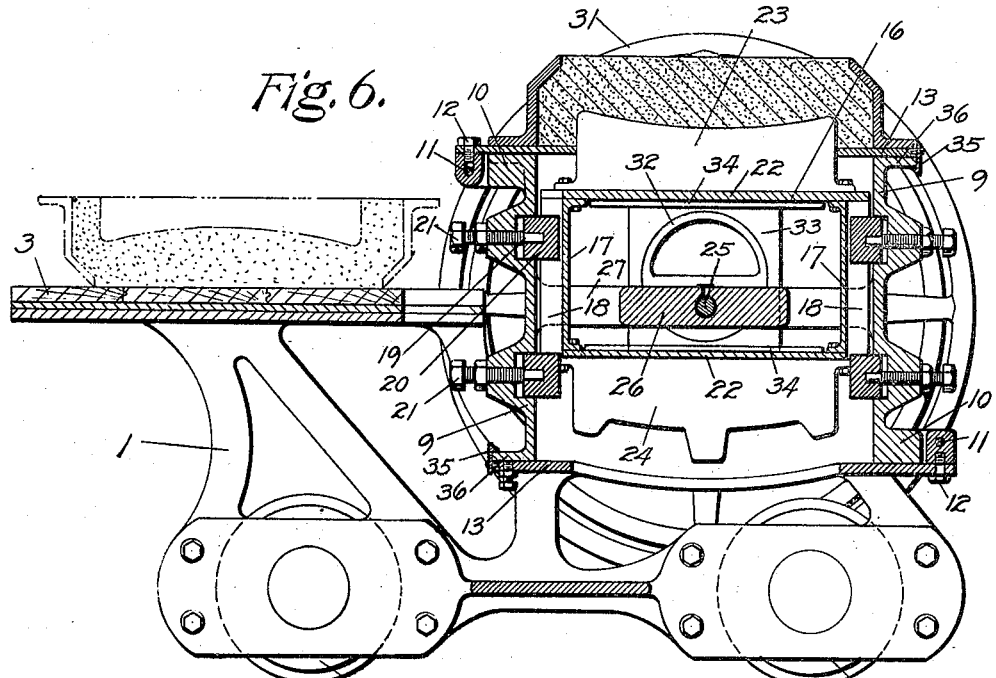
Figure 6 is a transverse sectional view, showing one set of the patterns projected through the associated stripper plate.
Figure 7:
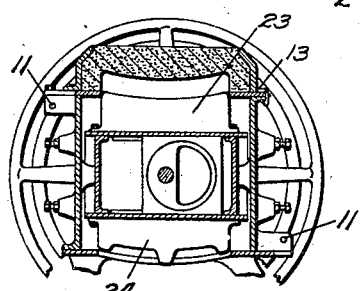
Figure 7 is a detail sectional view showing the eccentrics in a neutral position.
Figure 8:
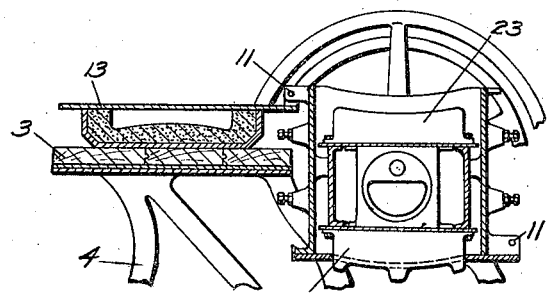
Figure 8 is a detail view showing the eccentrics in their lowermost positions, and one set of patterns withdrawn from the stripper plate and the other patterns in a position to be moved to their operative position.

In operation the flask part 40 is engaged on the uppermost stripper plate 13, and the patterns 23 are elevated to their highest positions, as shown in Fig. 6, through the medium of the eccentrics 32, and associated blocks 33 upon rotating the shaft 25, it being of course understood that the rotary movement necessary to turn the eccentrics is imparted to the shaft 25 upon operating the hand wheels 30. The sand is then tamped into the flask part 40, and since the patterns 23 project through the slots of the stripper plate the impressions thereof, which form the wear faces of the brake shoes will be formed in the sand. To withdraw the patterns 23 from the sand, the wheels 30 are rotated, as is the shaft 25, whereupon the eccentrics 32 will rotate and cause the associated blocks 33 to slide in the guides 34, thus causing the box 16 to move downwardly, in an obvious manner, until the eccentrics are in a neutral position, as shown in Fig. 7, and at which time the patterns 23 have been fully withdrawn from the sand. Upon further rotation of the shaft 25 the eccentrics 32 will assume the positions shown in Fig. 8, and at which time the eccentrics 32 will assume their lowermost position, and at which time the "lugged" patterns 24 will project through the slots in the lowermost stripper plate.

The flask parts 40 and 41 may be clamped to their respective stripper plates in any suitable manner so that when sand is being tamped therein they will remain rigidly positioned, and also when the stripper plates are being swung on their pivots to the platform 3.

Figure 9:
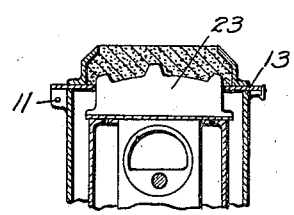
Figure 9 is a detail sectional view showing the "lugged" patterns in their operative position.

In order to place the perfected mold on the platform 3, a stripper plate carrying a flask part is swung on its pivots until the flask part rests on the platform 3, as shown in dotted lines in Fig. 6, after which it is removed and placed on the floor, and in such position forms the bottom of the mold. It is now necessary to position the "lugged" patterns and their associated stripper plate to co-operate with the flask part 41, as shown in Fig. 9. In order to accomplish this it is necessary to rotate the frame 8 to position the "lugged" patterns in their uppermost positions, which is done by rotating the wheels 31 one-half revolution. The flask part 41 is then placed on the stripper plate and the sand tamped therein. The patterns 24 are withdrawn in the same manner as previously described with respect to the patterns 23. The flask part 41 and associated stripper plate is swung until the part 41 rests on the platform 3. The flask part is then removed and placed on the flask part 40, and the mold is completed for casting a plurality of shoes simultaneously.

It is necessary that the frame 8 be held rigidly to prevent accidental rotation thereof when the sand is being tamped in the flask parts, and this is prevented by the bolts 38 and socket 37, the latter being so arranged that one bolt will engage the socket when either of the patterns are in their uppermost or operative position.

It is obvious that the bridge plates 15 will retain the mold walls and prevent the possibility of them crumbling when the patterns are being withdrawn or when the stripper plates are being swung to the platform 3.

It is sometimes desired to make the impressions in the mold sand of less depth than the throw of the eccentrics will permit, and to accomplish this the bolts 12 can be adjusted so that the stripper plates 13 will be spaced from the adjacent edges of the frame 8, it being necessary under such conditions to place shims or the like between the plates and frame, thereby holding said plates perfectly even.

In the modified form of the invention, as shown in Figs. 12 and 13 there is shown a legged frame 46 having a vertical arm 47 which is slidably engaged by the rack bar 48. Supported transversely of the frame in boxes 49 is a shaft 50 carrying a pinion 51 adapted to mesh with the rack bar 48. A horizontal arm 52 is pivotally supported on the bar 48, and is held against vertical movement thereon by collars 53. Adjustably connected to the end of the arm 52 is a tamping plate 54.

The frame 55 is pivotally supported on the frame 46, and since the construction and operation of the pattern supporting box 56 is similar to that of the preferred form it is not thought necessary to go into detail. The patterns 57 in this instance are for forming gears, and the flask parts (not shown) are placed on the uppermost stripper plate 58, after which the tamping plate is lowered to press the sand therein. To lower the plate 54 it is only necessary to rotate the shaft 50, which is done upon operating the hand lever 59.

What is claimed is:

1. In a molding machine, the combination with a rotatable frame, of a pattern supporting box slidably mounted in the frame, stripper plates carried by the frame and having a plurality of slots and resultant bridge pieces formed therein, and means for moving the patterns into and out of operative relation with the slots and bridge pieces.

2. In a molding machine, the combination with a rotatable frame, of stripper plates pivotally connected with the frame at diagonally disposed points, a pattern supporting box slidably mounted in the frame, and means for sliding the box to move the patterns into and out of operative relation with the plates.

3. In a molding machine, the combination with a rotatable frame, of a pattern supporting box slidably mounted therein and having patterns on the opposed faces thereof, stripper plates hingedly connected with the opposite sides of the frame, and means for sliding the box to cause the patterns to alternately operatively engage the stripper plates.

4. In a molding machine, the combination with a rotatable frame, of stripper plates hingedly connected with the opposite sides of the frame, a pattern supporting box slidably mounted in the frame, said plates having slots formed therein and resultant bridge pieces, means for sliding the box to move the patterns into projecting relation with the slots and bridge pieces of one of the stripper plates for co-operative relation with a flask part, said flask and associated plate being adapted to swing simultaneously to an inoperative position upon withdrawing the patterns from the slots.

5. In a molding machine, the combination with a rotatable frame, of stripper plates hingedly connected with opposite sides of the frame, said plates having slots and resultant bridge pieces, a box slidably mounted in the frame and having spaced patterns carried by opposite sides, means for sliding the box to move the patterns into and out of operative relation with the adjacent stripper plates, and means for rotating the frame and box to place selected patterns in a position for co-operation with a flask part.

6. In a molding machine, the combination with a rotatable frame, of a pattern supporting box slidably mounted therein, stripper plates carried by the frame, means for rotating the box and frame simultaneously, means for sliding the box to move the patterns into and out of operative relation with the stripper plates, and means for holding the frame against rotation when a flask part is engaged on the uppermost stripper plate.

7. In a molding machine, the combination with a wheeled truck, of a frame having trunnions on its ends and journaled on the truck, stripper plates carried by the frame, a shaft journaled in the trunnions, a box mounted in the frame and having patterns carried thereby for co-operation with the stripper plates, eccentrics fixed to the shaft and having blocks associated therewith, and independent means for rotating the frame and box, said blocks slidably engaging the box, independent means for rotating the shaft and eccentrics to impart sliding movement to the box to move the patterns into and out of engagement with the stripper plates, and means co-operative with the truck to hold the frame against rotation.

8. In a molding machine, the combination with a rotatable frame, of a box slidably mounted in the frame and having patterns on opposite sides thereof, stripper plates carried by opposite sides of the frame in normal vertical alinement, and in alinement with the patterns, means for simultaneously rotating the frame and box to position selected patterns uppermost, and means for sliding the box to move the selected patterns into and out of operative relation with the associated stripper plate, and means for holding the frame against accidental rotation when the patterns are co-operatively engaged with the uppermost stripper plate.

9. In a molding machine, the combination with a rotatable frame, of stripper plates hingedly and adjustably connected with the frame, a platform adjacent the frame, a pattern supporting box slidably mounted in the frame, said stripper plates being normally in vertical alinement, means for sliding the box to move certain of the patterns into operative relation with the uppermost stripper plate, a component part of a flask being supported on the uppermost stripper plate, said plate being adapted to be swung towards the platform to deposit the flask part thereon.

10. In a molding machine, the combination with a rotatable frame, of a box slidably mounted therein and having a series of spaced alined patterns thereon, a stripper plate associated with the frame, and having a plurality of slots and resultant bridge pieces formed therein, and means for moving the patterns into the slots so that the bridge pieces will occupy the spaces between the patterns.

In testimony whereof I have hereunto set my hand in presence of two subscribing witnesses.

FRANK T. DICKINSON.

Witnesses:
   SULLIVAN V. JOHNSON,
   ELIZABETH JOHNSON.